(12) United States Patent
Magri et al.

(10) Patent No.: US 9,485,028 B2
(45) Date of Patent: Nov. 1, 2016

(54) MODULATOR FOR OPTICAL TRANSMITTER

(75) Inventors: Roberto Magri, Parma (IT); Alberto Deho, Genova (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 108 days.

(21) Appl. No.: 14/119,744

(22) PCT Filed: Jun. 1, 2011

(86) PCT No.: PCT/EP2011/059036
§ 371 (c)(1),
(2), (4) Date: Mar. 6, 2014

(87) PCT Pub. No.: WO2012/163419
PCT Pub. Date: Dec. 6, 2012

(65) Prior Publication Data
US 2014/0169802 A1 Jun. 19, 2014

(51) Int. Cl.
*H04B 10/00* (2013.01)
*H04B 10/516* (2013.01)
*H04B 10/54* (2013.01)
*H04B 10/58* (2013.01)
*H04B 10/50* (2013.01)

(52) U.S. Cl.
CPC ...... *H04B 10/516* (2013.01); *H04B 10/50572* (2013.01); *H04B 10/541* (2013.01); *H04B 10/58* (2013.01)

(58) Field of Classification Search
USPC .................................. 398/182–214
See application file for complete search history.

(56) References Cited

U.S. PATENT DOCUMENTS

| 5,161,044 A | 11/1992 | Nazarathy et al. |
| 5,252,930 A | 10/1993 | Blauvelt |
| 5,327,279 A | 7/1994 | Farina et al. |
| 5,850,305 A | 12/1998 | Pidgeon |
| 6,721,081 B1 * | 4/2004 | Mauro ............... G02F 1/0123 359/239 |
| 7,936,998 B2 * | 5/2011 | Akiyama ............ G02F 1/2255 398/188 |
| 7,986,878 B2 * | 7/2011 | Saunders .......... H04B 10/5053 398/25 |
| 9,020,361 B2 * | 4/2015 | Kawakami ......... G02F 1/0123 398/188 |
| 2002/0005975 A1 * | 1/2002 | Nakamoto ........... G02F 1/0121 359/254 |

(Continued)

OTHER PUBLICATIONS

PCT International Search Report for PCT Counterpart Application No. PCT/EP2011/059036, (Jan. 30, 2012), 4 pages.

(Continued)

*Primary Examiner* — Agustin Bello
(74) *Attorney, Agent, or Firm* — Nicholson de Vos Webster & Elliott LLP

(57) ABSTRACT

An optical transmitter has a modulator for modulating data onto an optical signal for transmission to the receiver, the modulated signal having components at one or more constellations of points of different amplitudes and phases. The modulator is tunable such that distortions of the points of the one or more constellation can be tuned, and a tuning controller is provided for receiving a feedback signal from the receiver indicating a distortion measured at the receiver, and for tuning automatically the modulator to adjust the modulation based on the received feedback signal to pre-compensate for the measured distortion. Such pre-compensation can reduce the amount of distortion in the transmission system and thus enable more transmission capacity, without the need for a complex transmitter.

22 Claims, 15 Drawing Sheets

(56) References Cited

U.S. PATENT DOCUMENTS

| | | | | |
|---|---|---|---|---|
| 2002/0159121 | A1* | 10/2002 | Spickermann | H04B 10/50 398/200 |
| 2007/0274731 | A1* | 11/2007 | Boffi | H04B 10/505 398/188 |
| 2009/0028578 | A1 | 1/2009 | Sun et al. | |
| 2009/0196602 | A1* | 8/2009 | Saunders | H04B 10/5053 398/26 |
| 2011/0026935 | A1 | 2/2011 | Akiyama et al. | |
| 2011/0280582 | A1* | 11/2011 | Piehler | H04B 10/2507 398/117 |
| 2012/0141134 | A1* | 6/2012 | Hauske | H04B 10/25137 398/135 |
| 2012/0257896 | A1* | 10/2012 | Djordjevic | H04B 10/548 398/65 |
| 2014/0169802 | A1* | 6/2014 | Magri | H04B 10/541 398/183 |
| 2014/0376927 | A1* | 12/2014 | Piehler | H04B 10/25751 398/193 |

OTHER PUBLICATIONS

Papagiannakis, et al., "Electronic distortion compensation in the mitigation of optical transmission impairments: the view of joint project on mitigation of optical transmission impairments by electronic means ePhoton/ONe+ project," *Optoelectronics, IET* (vol. 3, Issue: 2), (Apr. 2009), pp. 73-85.

Schmidt, et al., "Experimental Demonstrations of Electronic Dispersion Compensation for Long-Haul Transmission Using Direct-Detection Optical OFDM," *Journal of Lightwave Technology*, vol. 26, No. 1, (Jan. 1, 2008), pp. 196-203.

PCT Written Opinion of the International Searching Authority for PCT Counterpart Application No. PCT/EP2011/059036, (Dec. 1, 2013), 5 pages.

PCT International Preliminary Report on Patentability (Chapter I) for PCT Counterpart Application No. PCT/EP2011/059036, (Dec. 2, 2013), 6 pages.

\* cited by examiner

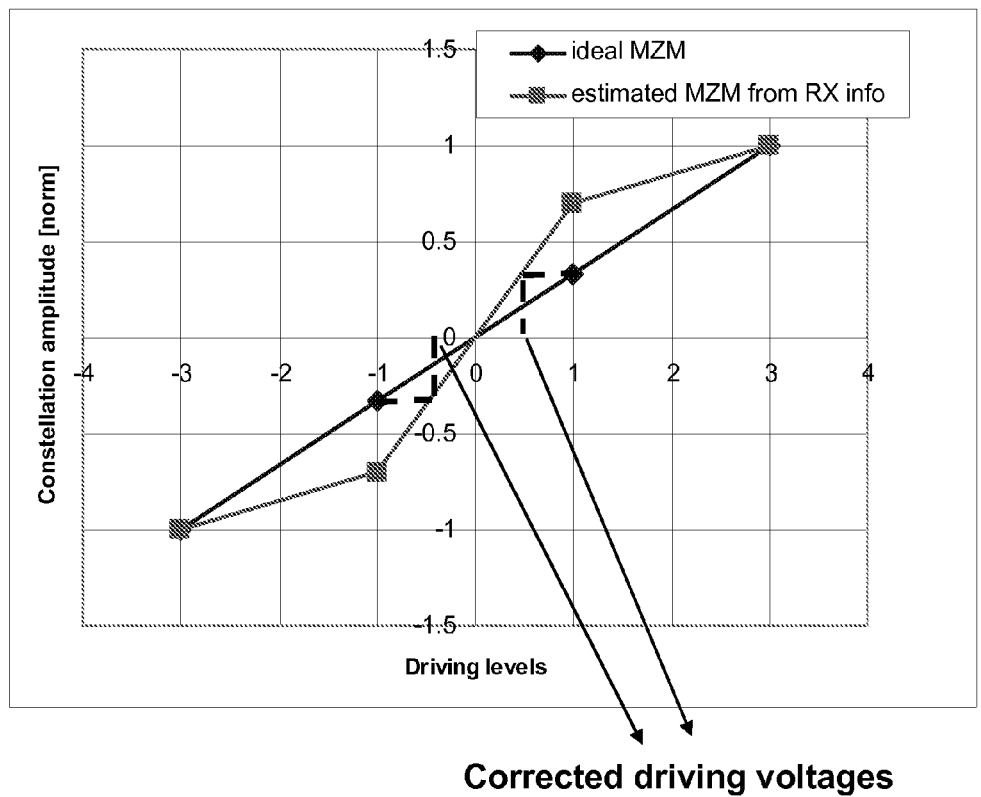
FIG 7
FIG 8
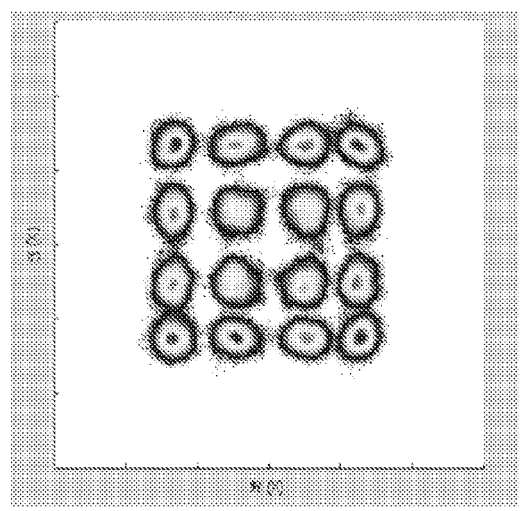
RX DSP Un-distorted constellation

MODULATOR FOR OPTICAL TRANSMITTER

CROSS-REFERENCE TO RELATED APPLICATIONS

This application is a National stage of International Application No. PCT/EP2011/059036, filed Jun. 1, 2011, which is hereby incorporated by reference.

TECHNICAL FIELD

This invention relates to optical transmitters having modulators, to optical transceivers, and to methods of tuning a modulator for an optical transmitter.

BACKGROUND

A current trend in optical telecommunications systems to achieve high traffic capacity and spectral efficiency is to exploit multi-level modulation formats like mQAM. These formats are useful for scaling the traffic capacity up to 400 Gb/s as is being demonstrated currently and soon up to 1 Tb/s.

However the realization of transmitter for multi-level modulation formats is not straightforward and may require complex architecture involving many optical and electrical components.

Many transmitter configurations have been identified with different pros and cons. The basic building block common in all schemes is the Mach Zehnder type modulator (MZM) which has an intrinsic non-linear voltage/optical power characteristic response.

$$\text{MZM transfer function} = I_{output} = \frac{1}{2}I_0\left(1 - \cos\left(\frac{\pi V}{V_\pi} + \phi\right)\right),$$

The function above shows that the MZ modulator has a sinusoidal response to the applied voltage. Other types of modulator have other characteristic distortions. This feature creates major issues in multi-level modulation schemes (e.g. mQAM) where multi-level electrical driving voltages are applied to the MZ modulator arms. The result is that the output constellation diagram is distorted according to the non-linear transfer function. In a traditional transmitter scheme a single MZM is used and a multilevel electrical signal is applied to it. In other known proposed schemes, multiple MZMs are combined in different ways, such as in series or parallel in order to build the mQAM constellation using only binary driving voltages. These solutions have the drawback of requiring several expensive optical modulators and components and complicate the transmitter scheme.

In one example a first MZM generates a QPSK scheme. A second MZM rotates it to generate a 16 QAM output. Furthermore, in these alternative schemes, it is anyway necessary to provide a very accurate bias and amplitude control of the MZMs in order to build up the QAM constellation correctly.

In the field of high capacity optical transport systems, techniques to avoid the MZM distortion problem are based on finding alternative and complex transmitter schemes involving a serial or parallel combination of several MZM modulators driven by binary signal. Another known approach is to modulate the MZM with a reduced amplitude RF signal in order to use only the linear part of the MZM dynamic range. This has the undesirable effect of reducing the extinction ratio of the output signal and thus reducing performance.

This problem of MZM non linearity, amongst other modulator distortions, is currently a limiting factor in the design of high bit rate interfaces. Currently it is addressed by over-engineering of the transmitter which increases cost, power consumption and space requirements.

SUMMARY

An object of the invention is to provide improved apparatus or methods. According to a first aspect, the invention provides an optical transmitter for an optical communications system having a remote optical receiver, the transmitter having a modulator for modulating data onto an optical signal for transmission to the receiver, the modulated signal having components at one or more constellations of points of different amplitudes and phases. The modulator is tunable such that distortions of the points of the one or more constellation can be tuned, and a tuning controller is provided for receiving a feedback signal from the receiver indicating a distortion measured at the receiver, and for tuning automatically the modulator to adjust the modulation based on the received feedback signal to pre-compensate for the measured distortion.

Such pre-compensation can reduce the amount of distortion in the transmission system and thus enable more transmission capacity. It can help avoid the need for a complex transmitter and thus reduce costs at the transmitter.

Another aspect of the invention can involve an optical transceiver for an optical communications system, having a coherent detector for receiving from a remote optical transceiver of the system, a modulated signal having components at a constellation of points of different optical amplitudes and phases, the detector being arranged to measure distortion in the positions of at least some of the points of the constellation. A local optical transmitter is provided for transmitting a feedback signal to the remote transceiver incorporating an indication of the measured distortion, for use in tuning the modulation at the remote optical transceiver. This can be the same transmitter as is used to send data traffic, or may be a separate transmitter.

By measuring the distortion and feeding it back to the transmitter, the transmission capacity can be improved with less complexity than other techniques.

Another aspect of the invention provides a method of tuning a modulator of an optical transmitter for an optical communications system having a remote optical receiver. Data is modulated onto an optical signal for transmission to the receiver, the modulated signal having components at a constellation of points of different optical amplitudes and phases. Feedback is received from the receiver indicating distortion measured at the receiver, and the modulating is tuned based on the received feedback to pre-compensate for the measured distortion.

Any additional features can be added to these aspects, or disclaimed from them, and some such features are described in more detail below. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 7 shows a graph showing a method to generate tuned MZM driving voltages from the distortion information fed back, FIG. 8 shows a compensated constellation at receiver

DETAILED DESCRIPTION

Figure 1:
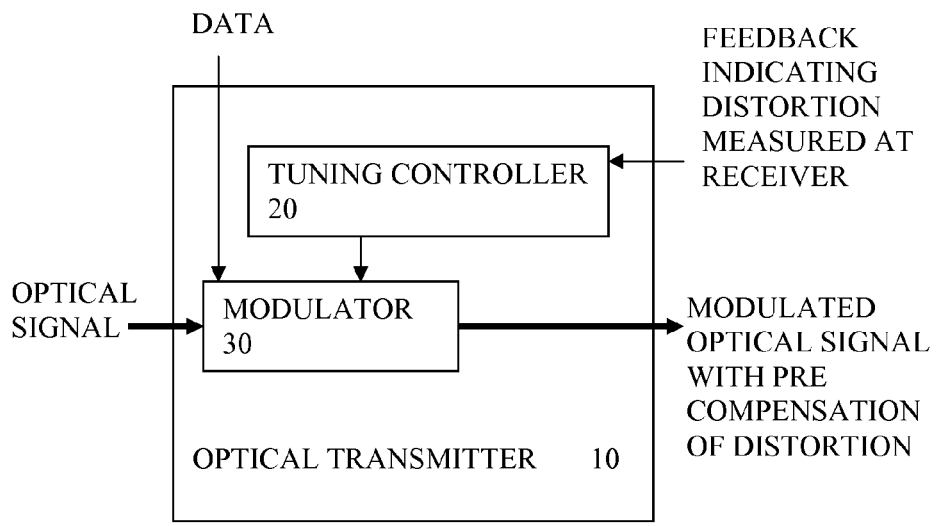
FIG. 1 shows a schematic view of a first embodiment

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

References to modulators can include any component or combination of components for modulating, including for example combining the outputs of two or more modulator elements, including modulating in the optical domain or in the electrical domain first before modulating in the optical domain.

Some Abbreviations

ADC Analog to Digital converter
BW Bandwidth
CATV Cable Television
DAC Digital to Analog Convertor
DSP Digital Signal Processing
MZM Mach Zehnder Modulator
OFDM Orthogonal Frequency Division Multiplexing
OSC Optical Supervisory Channel
OTN Optical Transport Network
QAM Quadrature Amplitude Modulation
RX receiver
TX Transmitter Introduction By way of introduction to the embodiments, some issues with known arrangements will be discussed. Historically, the problems related to the non linear transfer function of the MZM is well known and different techniques can be found in the prior art—mainly in the field of sub-carrier multiplexing, analog CATV or OFDM. These known techniques are based on the introduction of an electrical pre-distortion stage at the transmitter to compensate for the MZM transfer function. The pre-distortion stage is set to a fixed value in the simplest configuration. In more advanced approaches feed-forward and feed-back techniques are applied—all based on creating error signals for the control loop by adding additional RF circuit and/or optical devices and/or duplicated receivers to the transmitter. Furthermore advanced bias control is required. Some examples are shown in U.S. Pat. No. 5,327,279 and U.S. Pat. No. 5,850,305.

A drawback of the known solutions is the additional complexity of the transmitter if multiple modulators are used in parallel or in series to avoid the non linearity problem. To avoid such complexity in a transmitter, a single MZ modulator with multilevel driving signals can be chosen. From the above introduction it's clear that it is important to find a simple and reliable way to compensate for the distortion induced by the MZM modulator in a multilevel transmitter.

In addition, the use of a single modulation approach seems preferable in some cases such as newly proposed schemes where the electrical driving signals are built in the digital domain by means of AD (Analog to Digital) converters. This enables the realization of a flexible multi-format transmitter where the QAM modulation levels can be programmed using software control.

A way to adjust the driving voltage of an MZM I/Q modulator is to exploit the information of the receiver constellation made available by the coherent technology in the optical transport network. This typically involves determining phase as well as amplitude information. In an optical receiver this is the optical phase and typically involves two optical detectors and can be represented in x and y coordinates in the complex plane for example. Coherent receivers, in fact, enable the compensation and detection of the electric field of the signal by means of Digital Signal Processing (DSP). As part of the detection process, the receiver can also return, with little additional complexity, the constellation diagram of the received multilevel signal without any distortion contributed by the receiver itself.

In this way it is possible to measure the amount of compression of the constellation induced by the non-linear transfer function of the MZM modulator. The compression ratios of the various amplitude levels can then be backward propagated to the transmitter by any means. This can for example include feedback by using dedicated overhead bytes (since very small amounts of data need to be sent and only a very low rate of sending is required). The transmitter can then estimate the MZM transfer function by calculation typically carried out using software and can adjust consequently the modulator driving voltages.

The result can be a perfectly undistorted constellation without any need of additional circuitry neither at the transmitter nor at the receiver. Furthermore the whole dynamic range of the MZM can be used without reducing the Extinction Ratio.

The concept can be applied to any multilevel modulation (eg. any level of QAM, APK, ASK) and can apply to any of the transmitter configurations; but given that the non-linearity is compensated, the simple single I-Q MZM modulator with multilevel electrical driving voltages is a type of transmitter that can now be used.

Its applicability could in principle be extended from single carrier schemes to multi carrier schemes such as sub-carrier multiplexing modulation (e.g. SCM) but in this case the constellation distortion shape may be different and different parameters should be extracted from the constellation shape and transmitted back toward the transmitter.

Multicarrier schemes can for example use QAM with or without multilevel drive signals.

FIG. 1, A First Embodiment

In FIG. 1 a schematic view of a first embodiment of an optical transmitter 10 is shown. A modulator 30 modulates an incoming optical signal according to a data signal. A tuning controller 20 is provided for tuning the modulator according to feedback from a receiver (not shown). The feedback from the receiver indicates distortion measured in the received modulated optical signal after transmission. The tuning controller is arranged to tune the modulator so as to pre-compensate the modulated signal for the type of distortion measured at the receiver. There are various types of distortion which can be pre-compensated, such as modulator bias variations, or amplitude distortion or phase distortion introduced by the modulator or by other optical components in the optical path such as optical amplifiers, polarization related components, dispersion control parts, optical fiber and so on. The distortions are likely to vary relatively slowly over timescales of seconds or minutes, as temperature changes for example. Various implementations of the tuning controller can be envisaged, depending on the type of information in the feedback, the type of distortion and whether the tuning is to be done in the digital domain, analog domain, or optical domain or combinations of these for example. Various examples of a feedback path can be envisaged. The modulator may be implemented in various ways, for example having different modulator elements for different optical phases, or for different wavelengths and so on. Many different possible modulation schemes can be used.

Some Additional Features of Embodiments

In addition to the features discussed above, some additional features of various embodiments of the invention will now be discussed. The measured distortion received from the receiver can comprise bias distortion, or distortion in the relative positions of at least some of the points of the constellation amongst other possibilities. The feedback can be in any format and can encompass any coded or processed or compressed version of such measurements for example, including measurements processed to determine compensation amounts based on the measurements. Other possibilities can include for example distortions in the form of bit errors or receiver eye measurements.

The modulator in some embodiments can be arranged to output a single carrier modulated signal. This makes for a relatively simple system as there is only a single modulation to tune, and the tuning can be of modulator bias, or amplitude or phase of that modulation for example. In multi carrier systems there are more tuning possibilities and thus more complexity in both the tuning and in distinguishing which of the modulated carriers is causing the distortions which are measured. Distortion may appear as additional noise spread across multiple of the modulated carriers at the receiver, and tuning control may involve trying different adjustments or making oscillating adjustments to see whether part of the noise correlates with the adjustments, and therefore correlates with the non linearities of the corresponding modulator. Then the modulator or selected modulator element can be adjusted to pre compensate for such nonlinearities. Again this can be an iterative process.

In some embodiments, the modulator is arranged to modulate the data at multiple amplitude levels. This makes the system more sensitive to distortions such as non linearity distortion and hence pre compensation for any type of distortion is particularly useful to increase transmission capacity or to reduce complexity for a given capacity.

The feedback path can comprise a receiver for receiving an incoming optical signal, and a frame decoder for detecting a frame in the incoming optical signal and detecting the feedback in the frame, and passing the feedback to the tuning controller. This has a benefit of making use of existing protocols and designs. Also it can be implemented within one optical channel to guarantee feedback relates to the correct channel. An alternative is to use the known optical service channel OSC which has free bytes for future uses. This may be less suitable as it needs more effort to agree standards for this new use, and is not channel specific and so the feedback would typically need to identify which of the optical channels it relates to. At least this would avoid a need to change the framer part at each end of the optical path.

The measured distortion can comprise an amplitude non linearity, the tuning controller being arranged to tune the modulator to alter the amplitudes to pre-compensate for the measured amplitude non linearity. This can be of benefit as such amplitude non linearity is often more significant than other distortions.

The modulator can comprise a Mach-Zehnder modulator having a multilevel input signal, and circuitry for generating the multilevel input signal from the data, the modulator being tunable such that output levels of the modulated signal can be tuned by the tuning controller. An effect of applying this pre compensation to an MZM type is that because it is intrinsically susceptible to non linearity, thus the pre-compensation is particularly useful. This means it can be easier and less complex to implement a multilevel scheme and so the additional transmission capacity enabled by using multi level can be achieved without needing the complexity of multiple modulator elements.

The circuitry can have a digital gain control circuit for producing a multibit digital representation of each of the levels, tunable according to the tuning controller, and a digital to analog converter for converting the multibit digital representation into an analog multilevel signal for driving the Mach-Zehnder modulator. This is one implementation which can be easier to design and manufacture and lower cost than other implementations as the tuning is done in the digital domain.

In other embodiments, the circuitry can have a tunable digital to analog converter, tunable by the tuning controller. This may involve fewer parts or be able to reuse existing parts.

In other embodiments, the circuitry comprises a digital to analog converter and an analog gain controller tunable by the tuning controller. This may also be able to reduce the part count or use existing parts, and may enable finer tuning control than digital domain implementations.

In some embodiments, the modulator has two or more modulator elements each for generating a different one of the amplitudes, an optical part for combining the optical outputs of the two or more modulator elements and a tunable optical level controller for controlling the relative levels of the optical outputs, under the control of the tuning controller. This enables the tuning to be carried out in the optical domain which may enable simpler modulator elements or existing parts to be used.

In some embodiments the tuning controller is arranged to determine a new tuning setting for the modulator based on the feedback, and on characteristics of the modulator. This can enable better control of tuning and may help reduce a number of iterations in an iterative tuning process.

In some embodiments the modulator has a tunable phase rotator, the tuning controller being coupled to control the tuning of the phase rotator if the feedback indicates a phase distortion. This is one way of enabling phase distortions to be compensated.

In some embodiments the modulator is arranged to output a multicarrier modulated signal. This has advantages in terms of spectrum usage but makes pre-compensation more complex if there are many carriers and if there is a need to ascertain which measured distortions are attributable to which of the carriers.

In some embodiments there is an optical transceiver for an optical communications system, the transceiver having a coherent detector for receiving from a remote optical transmitter of the system, a modulated signal having components at a constellation of points of different optical amplitudes and phases, the detector being arranged to measure distortion in the positions of at least some of the points of the constellation, and a local optical transmitter for transmitting a feedback signal to the remote transmitter incorporating an indication of the measured distortion, for use in tuning the modulation at the remote optical transceiver. In some embodiments there is a system comprising the transmitter and the transceiver for providing the feedback to the transmitter.

In some embodiments of the optical transceiver there is a framer for incorporating the indication of the measured distortion in a frame of the return optical signal, to provide feedback to the remote transceiver.

In other embodiments of the optical transceiver, where the measured distortion comprises an amplitude non linearity, the coherent detector is arranged to measure the amplitude non linearity, and the framer is arranged to incorporate the indication of the measured amplitude non linearity in the frame of the return optical signal.

Embodiments of the corresponding method of tuning can involve additional features similar to those discussed above. The measured distortion in the received feedback can comprise distortion in the positions of at least some of the points of the constellation. The modulating step can comprise outputting a single carrier modulated signal.

The modulating step can comprise modulating the data at multiple amplitude levels.

The feedback can be incorporated in an incoming optical signal, the method having the step of detecting a frame in the incoming optical signal and detecting the feedback in the frame.

Where the distortion comprises an amplitude non linearity, the method can have the step of tuning the modulating step to alter the amplitudes to pre-compensate for the measured amplitude non linearity.

The modulating step can comprise using a Mach-Zehnder modulator having a multilevel input signal, and generating the multilevel input signal from the data, and the tuning can comprise tuning of the output levels of the modulated signal.

Figure 2:
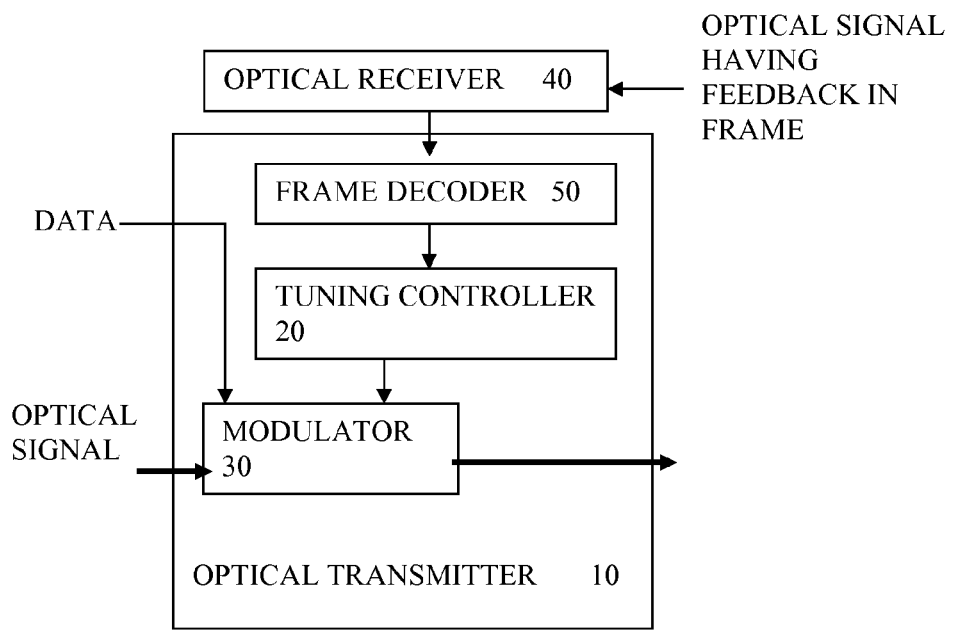
FIG. 2 shows another embodiment using frame based feedback

FIG. 2, Another Embodiment Using Frame Based Feedback

FIG. 2 shows an embodiment similar to that of FIG. 1 and having the feedback provided in frames over an optical link. Hence there is an optical receiver 40 for receiving the feedback, and a frame decoder 50 for detecting the frames in the stream of data and locating the feedback in a specified part of the frames. Thus the transmitter in this case can be part of an optical transceiver. The feedback can be fitted into unused bytes reserved for future use in standard OTN frames for example.

Figure 3:
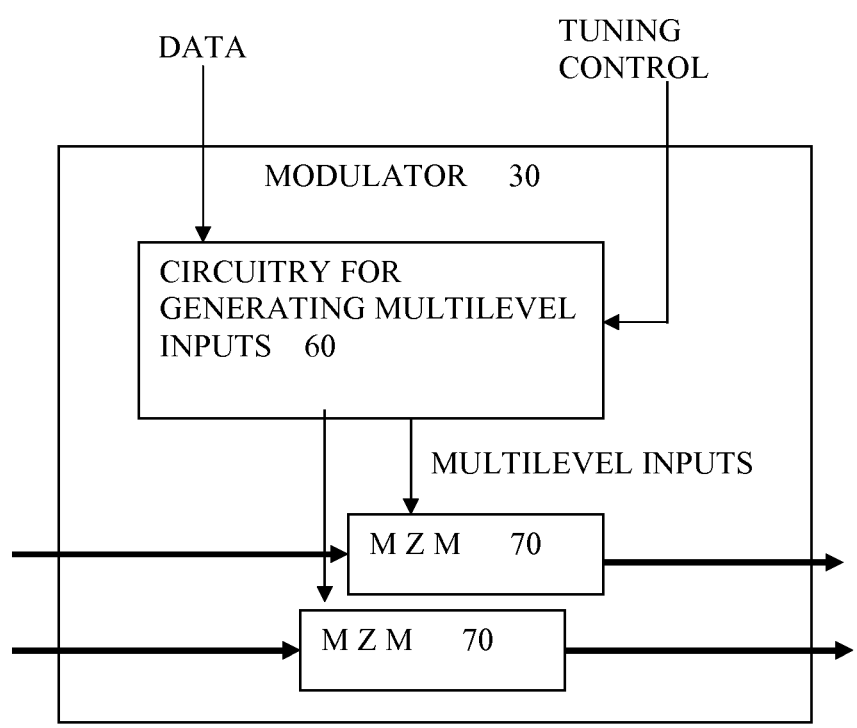
FIG. 3 shows a modulator for another embodiment using multilevel inputs

FIG. 3, Modulator for Another Embodiment Using Multilevel Inputs

FIG. 3 shows an embodiment similar to that of FIG. 1, though here the modulator has modulator elements 70. In this case MZM types having multilevel inputs are shown, though other types can be used. Circuitry 60 is provided for generating the multilevel inputs from the data. Various ways of implementing this circuitry can be envisaged and some are described below with reference to FIGS. 9 to 11. The modulator element can be for modulating I and Q components respectively of the optical signal. This requires a coherent receiver at the far end of the optical path to separate the components again after transmission.

Figure 4:
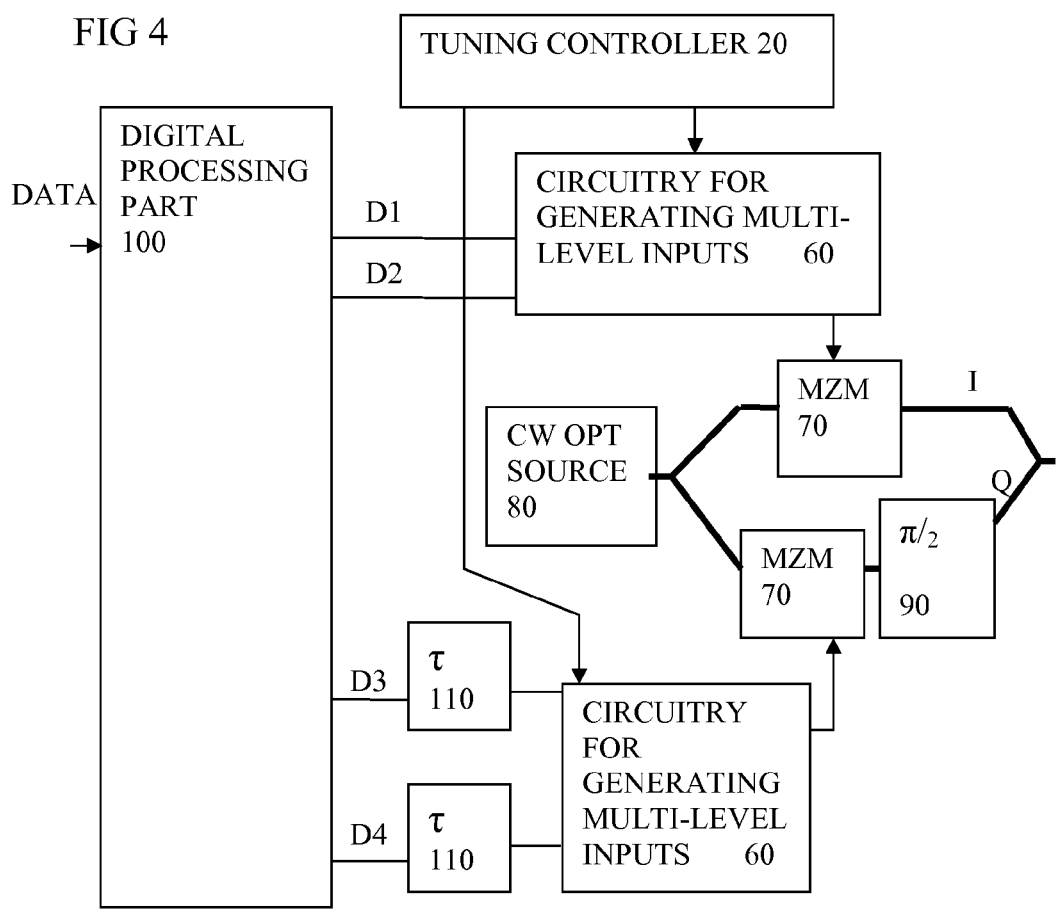
FIG. 4 shows another embodiment having I and Q modulator elements

FIG. 4 Another Embodiment Having I and Q Modulator Elements

FIG. 4 shows another embodiment having I and Q modulator elements in the form of MZMs 70. These are on two optical paths from the same optical source 80 providing a continuous wave optical signal. Before being recombined, an optical phase changer 90 is provided to ensure one of the paths is optically out of phase with the other. The MZMs for each of the I and Q paths are fed by circuitry 60 for generating multi-level inputs. A tuning controller provides a tuning input to each of these circuits to tune the modulations. Data inputs D1 and D2 are binary digital signals which are converted into a multi level signal for driving one MZM. Data inputs D3 and D4 are binary digital signals which are converted into a multi level signal for driving the other of the MZMs. A corresponding delay part 110 is provided on these digital inputs, to correspond to the delay in the optical domain. A digital processing part 100 is provided to generate D1, D2, D3 and D4 from the data input, according to whatever coding and modulation scheme is being used, following conventional practice.

Figure 5:
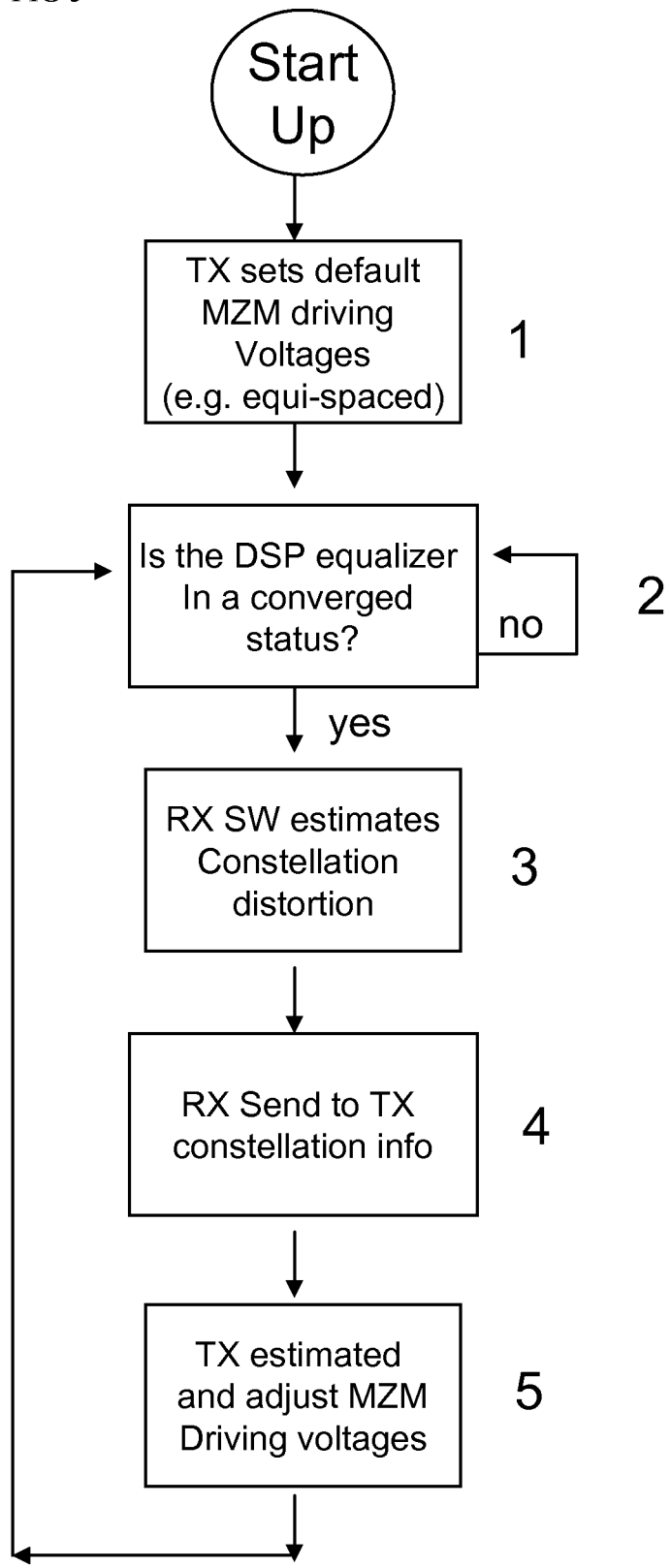
FIG. 5 shows a flowchart highlighting some steps according to an embodiment.
Figure 6:
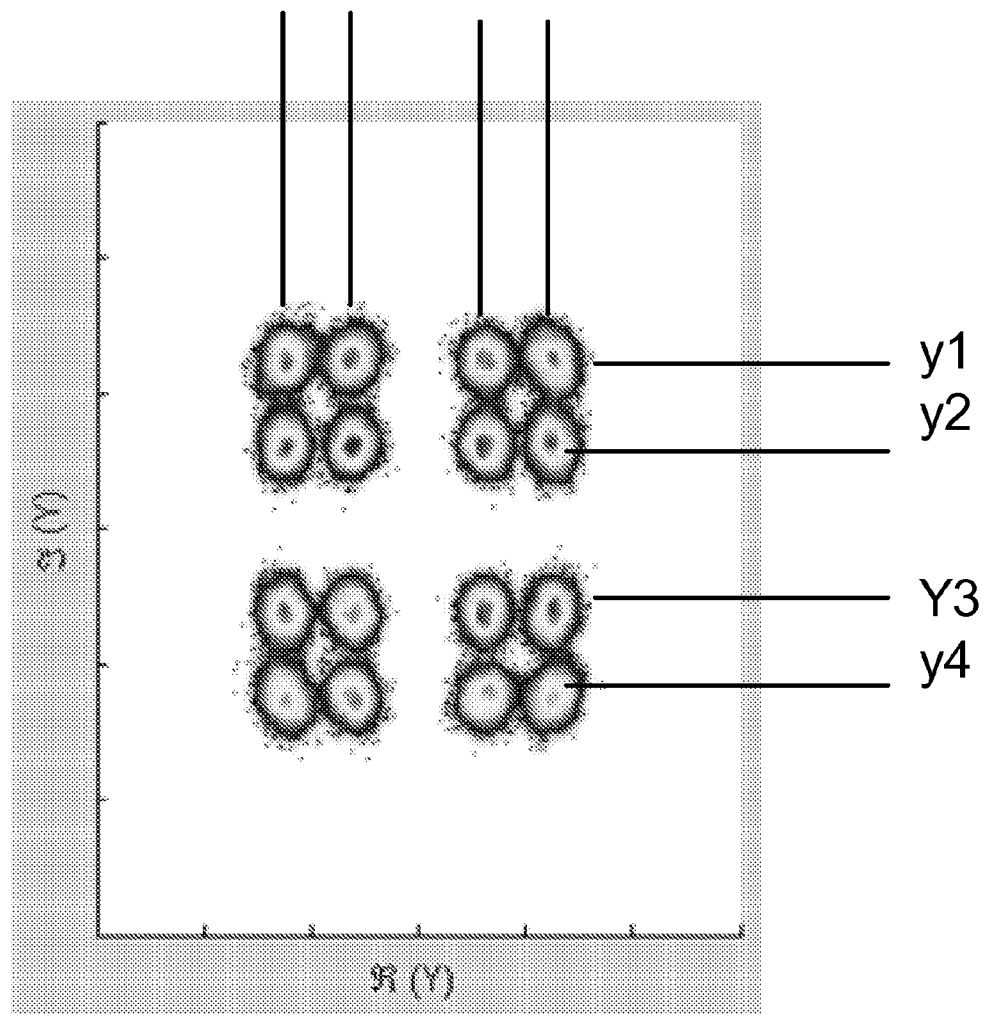
FIG. 6 shows a distorted constellation from the RX DSP

FIG. 5, Flowchart Highlighting Some Steps According to an Embodiment, and FIG. 6: Distorted Constellation from the RX DSP The steps labeled 1 to 5 are here shown for a 16-QAM case to describe an example of the operation of an embodiment of the invention. Each of the steps is now described in order as shown in FIG. 5.

1) At start-up the MZM modulator is driven with default voltages. In the easiest implementation these can be just multi-level equi-spaced electrical signals. Alternatively some pre-loaded pre-distorted values can be used as a first try.

2) With the start-up settings the DSP equalizer at the coherent receiver side should be able to reach a good convergence point and detect the received constellation. In fact the MZM distortion is typically not strong enough to prevent the DSP from reaching a convergence.

3) Once a correct constellation is received the pre compensation method can start operating. The RX SW extracts from the constellation the level of amplitude compression induced by the MZM. The mQAM constellation will have log 2(m) amplitude levels for both the in-phase and quadrature components. For simplicity, the method for the 16 QAM case is described without loss of generality.

The picture in FIG. 6 shows the received constellation with the effect of the distortion induced by driving the MZM at full Vpi and equi-spaced levels. The distortion is represented by the points of the constellation being compressed toward the corners due to the sinusoidal response of the MZM.

The distortion information can be represented in different ways. A simple way could be to pass the 8 (m in general) values x1, x2, x4, x4 and y1, y2, y3, y4 obtained by averaging the m raw and columns of the constellation over a number of data bits received. But one could envisage sending their normalized ratios or other processed versions of the information.

4) The distortion information can be fed back to the transmitter by means of free OTN frame bytes (using those bytes not-used or for future use). It is not important to update the values at a high rate since only temperature/ageing changes must be tracked so the required BW is limited. The OSC could in principle also be used, as an alternative or as well.

5) The Transmitter side (for example the tuning controller part) estimates an adjustment to be made to the levels (and/or the phase) to carry out a precompensation by adjusting the MZM driving voltages. This estimation could in principle be carried out partly or all at the receiver side. It can involve fitting the distortion data to a graph in the following way as described with reference to the graph of FIG. 7.

FIG. 7: Graph Showing Method to Generate Tuned MZM Driving Voltages from the Distortion Information Fed Back The x-axis in the graph of FIG. 7 represents the driving voltages for a MZM and the y-axis shows the resulting amplitude at the output of the MZM to show a transfer function of the MZM. Two lines are shown, one being a desired ideal linear function (straight line) and the other being an estimated or actual output based on the measurements at the receiver. To maximize transmission capacity, the outputs should be equally spaced to minimize interference. When the transmitter uses ideal equi-spaced voltages (−3, −1, 1, 3), the received constellation has measured values as shown on the curved line, which can be sent back to the TX. From the construction of the picture above, the TX can calculate the corrected driving voltages to compensate for the MZM non linear compression. This can involve interpolating between the measured points to find an x coordinate value which gives the desired y coordinate value on the straight line. This process is illustrated graphically and an appropriate software algorithm can be used to achieve this in practice.

The process can be iterated in closed loop as described in the flow chart. Some hysteresis control can be applied at the transmitter in order to filter out any small oscillations to achieve a better convergence.

In dual polarization systems the method can be applied to both I and Q MZMs. In general this method could be used also to improve the bias and amplitude control of the MZM since all the required information about the constellation shape can be propagated. The method has been experimentally proven using a 16 QAM dual polarization transmitter for a 224 Gb/s demonstrator.

FIG. 8: Compensated Constellation at Receiver

FIG. 8 shows a view similar to that of FIG. 6 but after pre-compensation has been applied. It shows that the points on the constellation are more equally spaced and thus less likely to produce bit errors. In this example a 16 QAM modulation scheme is used, and the distortion and thus compensation is of amplitude non linearity, though similar results can be achieved for other distortions such as phase distortion or combinations of amplitude and phase distortions.

Figure 9:
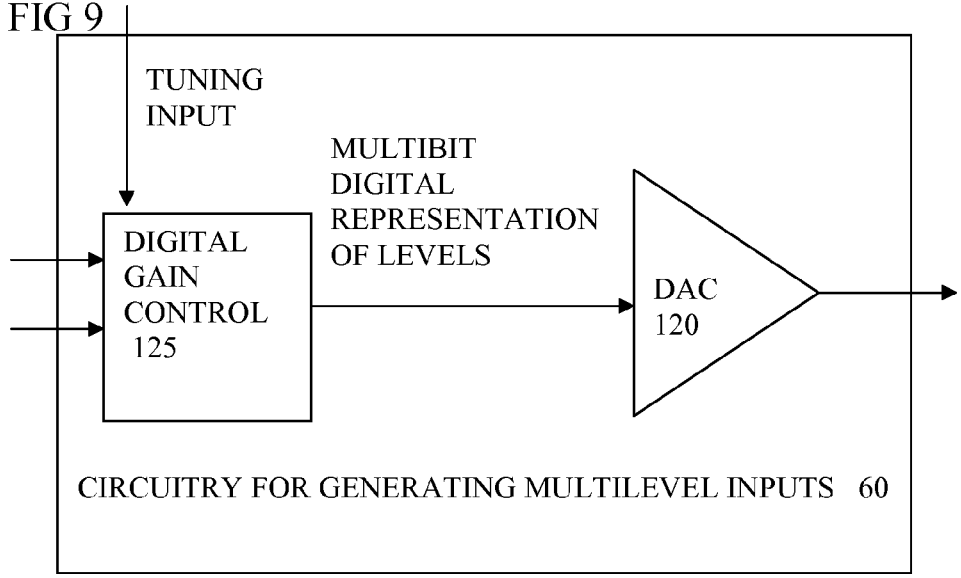
FIGS. 9 to 11 show embodiments of circuitry for generating multilevel inputs
Figure 10:
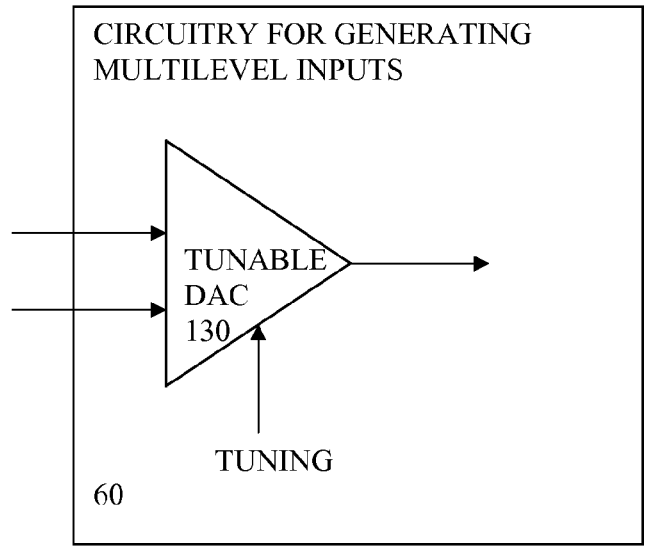
Figure 11:
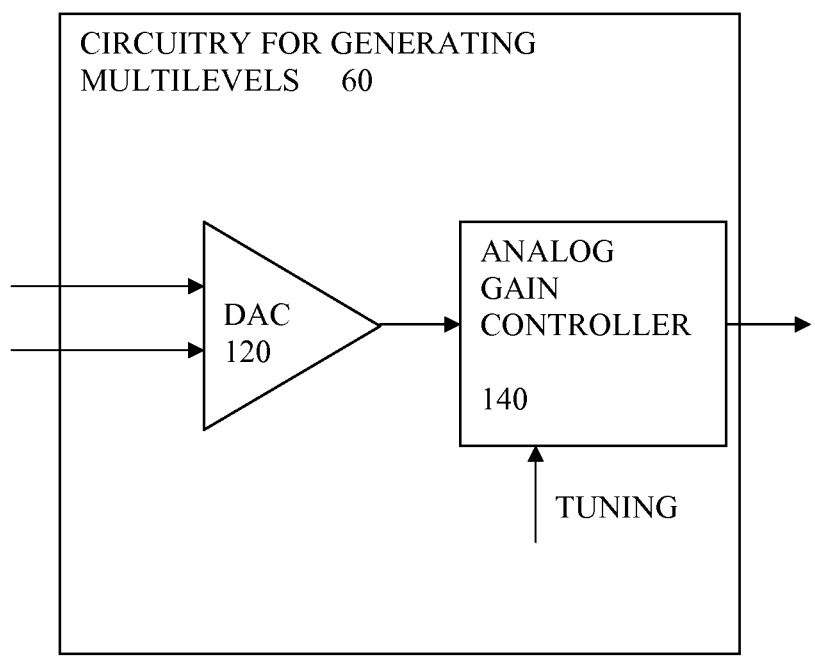

FIGS. 9 to 11, Embodiments of Circuitry for Generating Multilevel Inputs

FIGS. 9 to 11 show schematic views of examples of how to implement the circuitry 60 for generating multilevel inputs so that the modulation can be tunable. In each case, binary data inputs are provided and a multilevel analog output is generated, the levels being tuned according to a tuning input. FIG. 9 shows an example with the tuning being of amplitude levels and being in the digital domain. A digital gain control part receives the binary data and produces a multibit (typically 8 bits) digital representation. Hence there are 4 levels, depending on the two binary inputs, which could be represented by 4 of the possible 256 combinations of the 8 bit digital output. In one example, the 4 levels could be 50, 100, 150 and 200. The tuning input could vary the gain non linearly, by altering these values to for example 50, 120, 130, and 200 for example, to produce precompensation for the type of distortion shown in FIG. 7. This can be achieved by a look up table for example or other digital circuitry. The tuning signal can have any format, from being single value indicating a degree of non linearity, to an array of values representing the transfer function and thus indicating the gain at all four data input values for example. The digital multilevel signal is fed to a DAC 120 to produce the analog drive signal for the modulator element.

FIG. 10 shows an alternative example in which a tunable DAC 130 is used. The tuning input is fed directly to the tunable DAC and the analog output is therefore a function of both the binary data inputs and the tuning input. In the example of FIG. 11, the tuning is carried out in the analog domain. A DAC 120 converts the binary data inputs into an analog signal. This is fed to an analog gain controller which alters the gain in a non linear fashion as desired to make the precompensation according to the tuning input.

Figure 12:
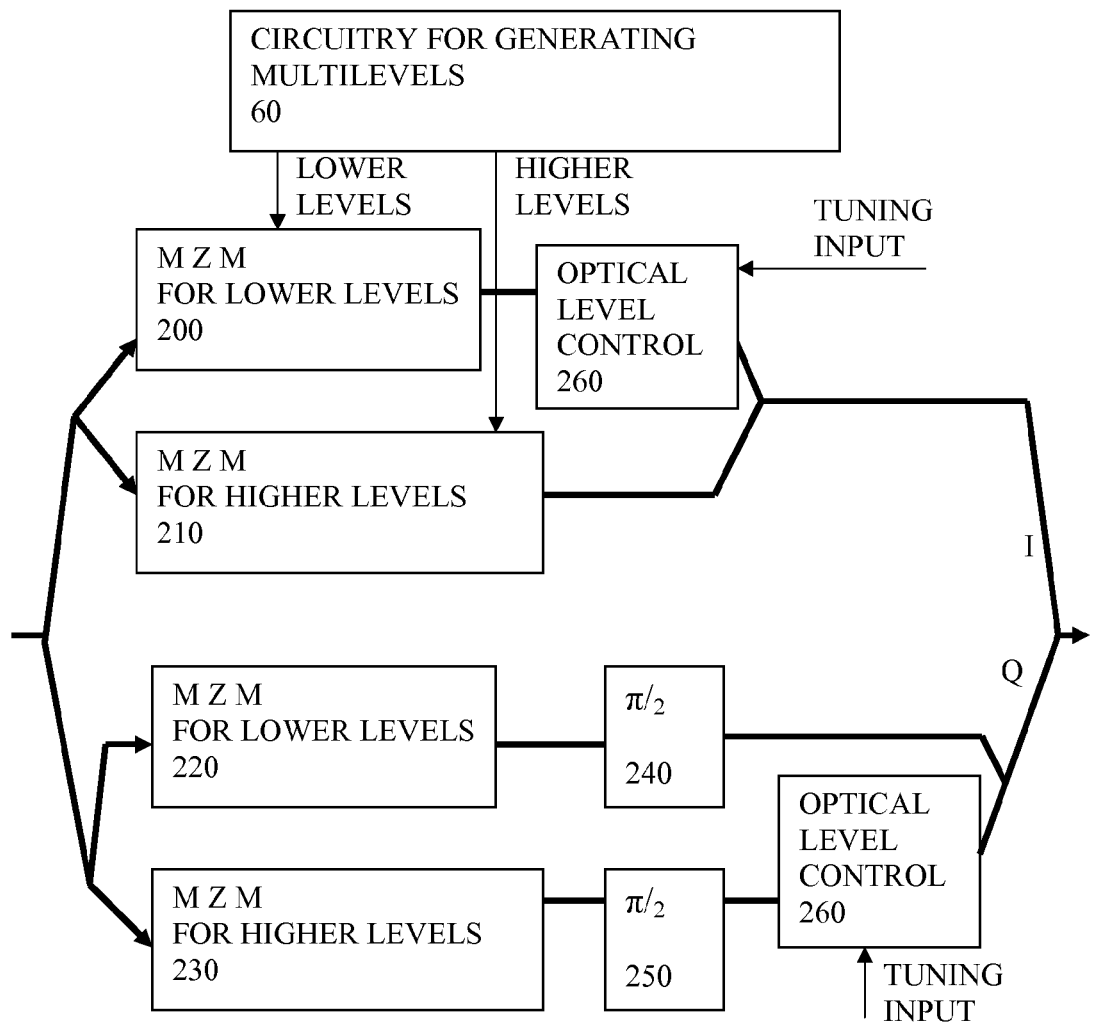
FIG. 12 shows an embodiment having separate modulator elements for different levels and having optical domain tuning.

FIG. 12, Embodiment Having Separate Modulator Elements for Different Levels and Having Optical Domain Tuning FIG. 12 shows a schematic view of another embodiment, this time having multiple modulator elements in the form of MZMs for different levels. There is an optical level control part 260 which can be for example an attenuator (or in principle an optical amplifier) to vary the relative optical levels output by the different MZMs, in other words, to tune the levels. This optical level control can be carried out based on the tuning input from the tuning controller, and thus the tuning of the modulation is carried out in the optical domain. Compared to other embodiments, the MZMs can be less precise types or types having more distortion since there is tuning after these MZMs, so the MZMs may be less expensive.

In FIG. 12, MZMs 200 and 210 are coupled in parallel, one for modulating one or more lower levels, the other for modulating one or more higher levels. The outputs are combined to produce an I optical signal. The Q optical signal is produced in a similar fashion by MZMs 220 and 230. Phase shift parts 240 and 250 are provided on the Q arms to provide the necessary delay to make the Q signal out of phase with the I signal. For both I and Q parts there is circuitry 60 for generating the multilevel inputs for the respective MZMs. The implementations shown in FIGS. 9 to 11 could be adapted to produce separate outputs for the lower levels and the higher levels. There can optionally be a tuning input to the circuitry for generating the multilevel inputs.

Figure 13:
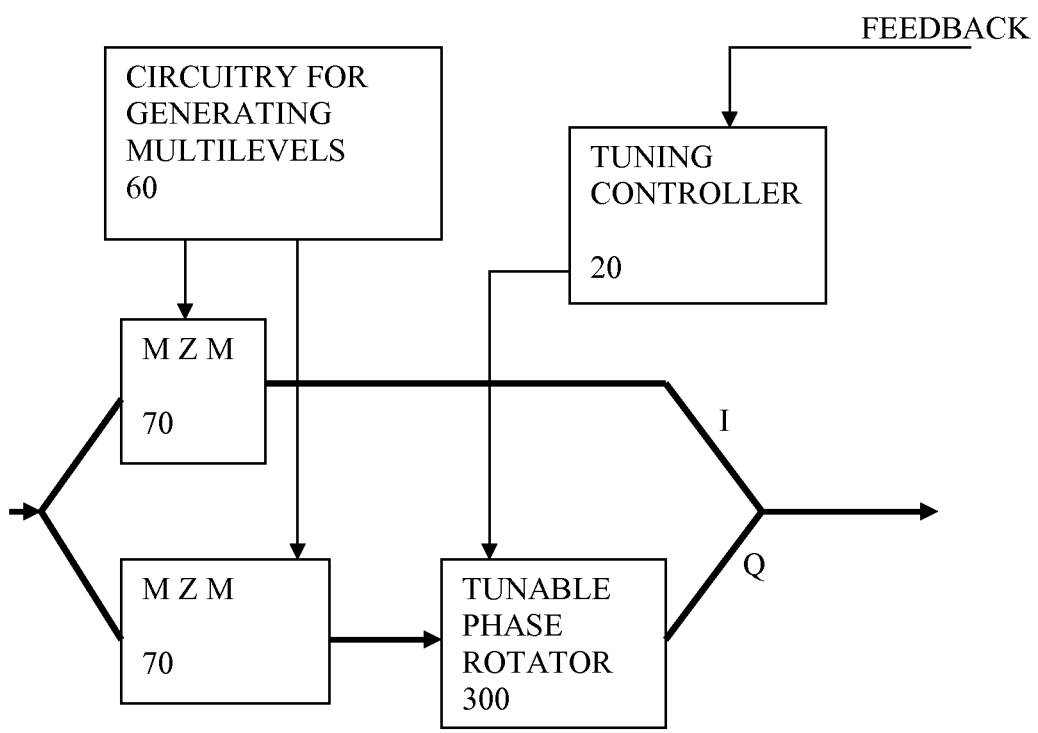
FIG. 13 shows an embodiment having phase rotator for tuning

FIG. 13, Embodiment Having Phase Rotator for Tuning

FIG. 13 shows in schematic form another embodiment of parts of an optical transmitter, similar to that of FIG. 4, but in this case having a tunable phase shifter 300 in one or both of the I and Q optical paths to give tuning in the optical domain. This involves tuning the phase, to pre compensate for phase errors introduced anywhere in the optical path. Again the tuning is based on feedback from the coherent optical receiver to a tuning controller 20. The tuning controller can optionally also provide amplitude tuning This can for example be implemented in any of the digital, analog or optical domains as described above.

Figure 14:
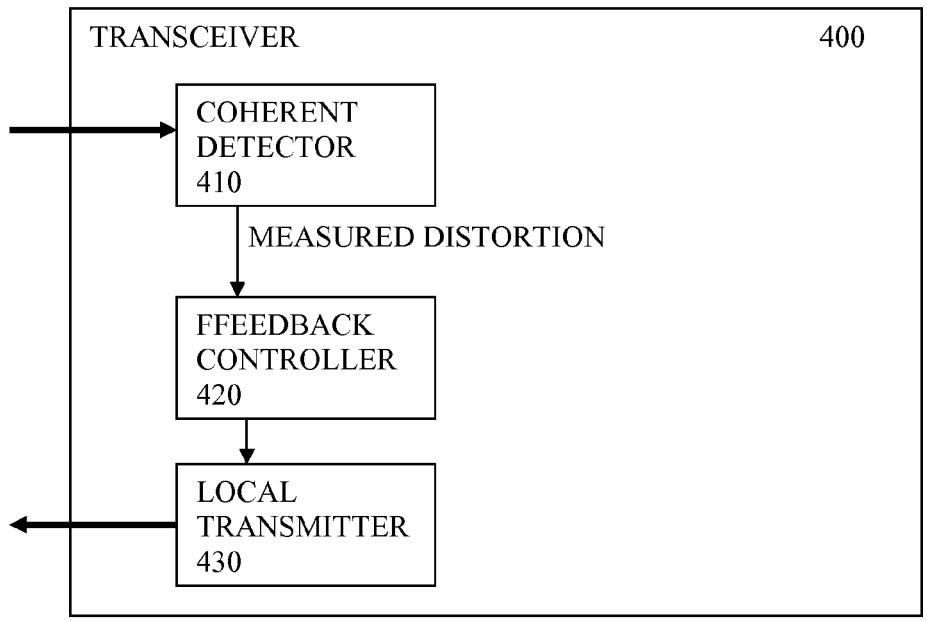
FIG. 14 shows an embodiment of transceiver for measuring distortion and feeding it back to transmitter.

FIG. 14 Embodiment of Transceiver for Measuring Distortion and Feeding it Back to Transmitter FIG. 14 shows an example of some parts of an optical transceiver 400 for use with the optical transmitters described above, to measure the distortion and feed it back to the transmitter to enable the pre-compensation to be carried out. A coherent detector 410 is provided, which can be implemented following established practice. Measurements of distortion can be output, such as x and y coordinates of points on the constellation, or amplitude distortion or phase distortion, or bias error, or bit errors or combinations of these for example. A feedback controller 420 can be provided to incorporate the distortion measurements into a data stream being sent back to the transmitter. This can be implemented by a framer for incorporating the feedback information into chosen bytes of an OTN frame for example. A local transmitter 430 can be implemented as an optical transmitter to form a bidirectional optical channel, to provide the path for the feedback information.

Figure 15:
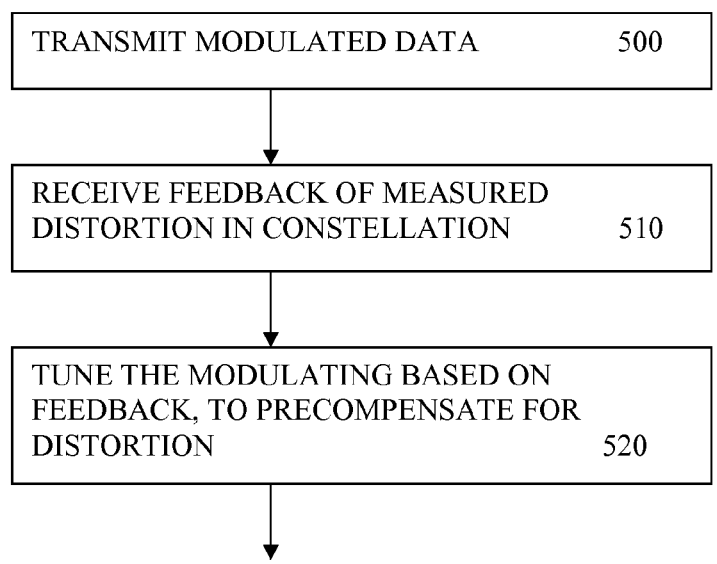
FIG. 15 shows an embodiment showing method steps

FIG. 15, Embodiment Showing Method Steps

FIG. 15 shows some of the principal operational steps according to an embodiment.

At step 500, modulated data is transmitted. At step 510, feedback is received by the transmitter, the feedback indicating a measurement of the distortion, such as measured x and y coordinates of points of a constellation in the complex plane, or amplitude distortion or phase distortion, or bit errors or combinations of these for example. At step 520, the modulating is tuned based on the feedback, to precompensate for the measured distortion. Any other features can be added in different embodiments.

Figure 16:
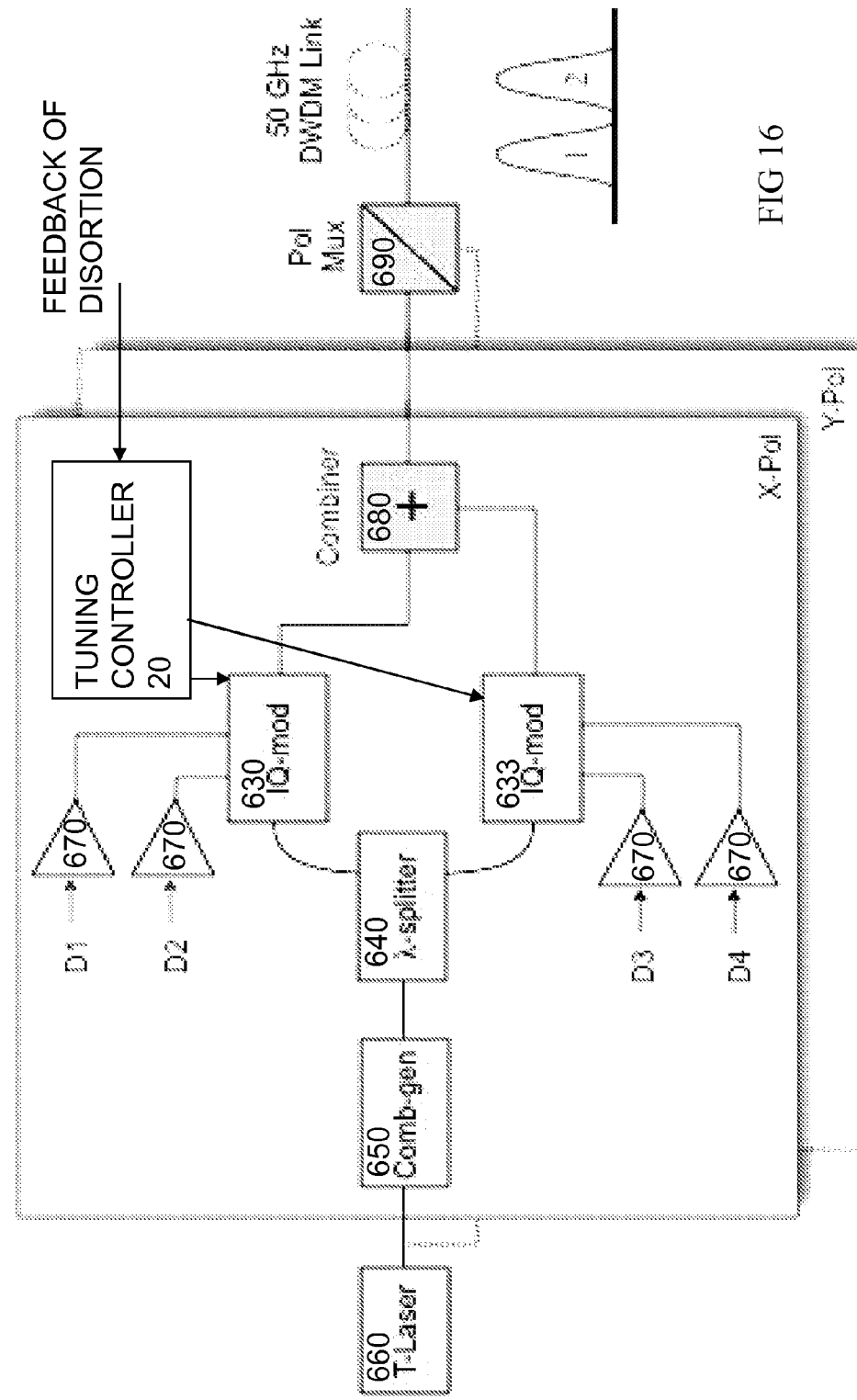
FIG. 16 shows an embodiment showing transmitter having modulators for different wavelengths and for different polarizations

FIG. 16, Embodiment Showing Transmitter Having Modulators for Different Wavelengths and for Different Polarizations FIG. 16 shows an optical transmitter embodiment having a number of modulators for modulating a single carrier on each of different optical wavelengths and optical polarizations. A laser 660 feeds two sets of parts each for different optical polarizations pol-x and pol-y. For each polarization there is a comb filter 650 to generate different wavelengths. A wavelength splitter 640 feeds separate wavelengths to IQ modulators 630 and 633 respectively for wavelengths 1 and 2. Data inputs D1 to D4 are fed to the modulators via buffers 670. A tuning controller 20 is operable to tune the IQ modulators, for example using any of the techniques described above. A combiner 680 combines the wavelengths following modulation. A polarization multiplexer 690 combines the optical signals of different polarizations for transmission as a DWDM signal of data rate of 50 GHz for example, if there are many wavelengths.

Figure 17:
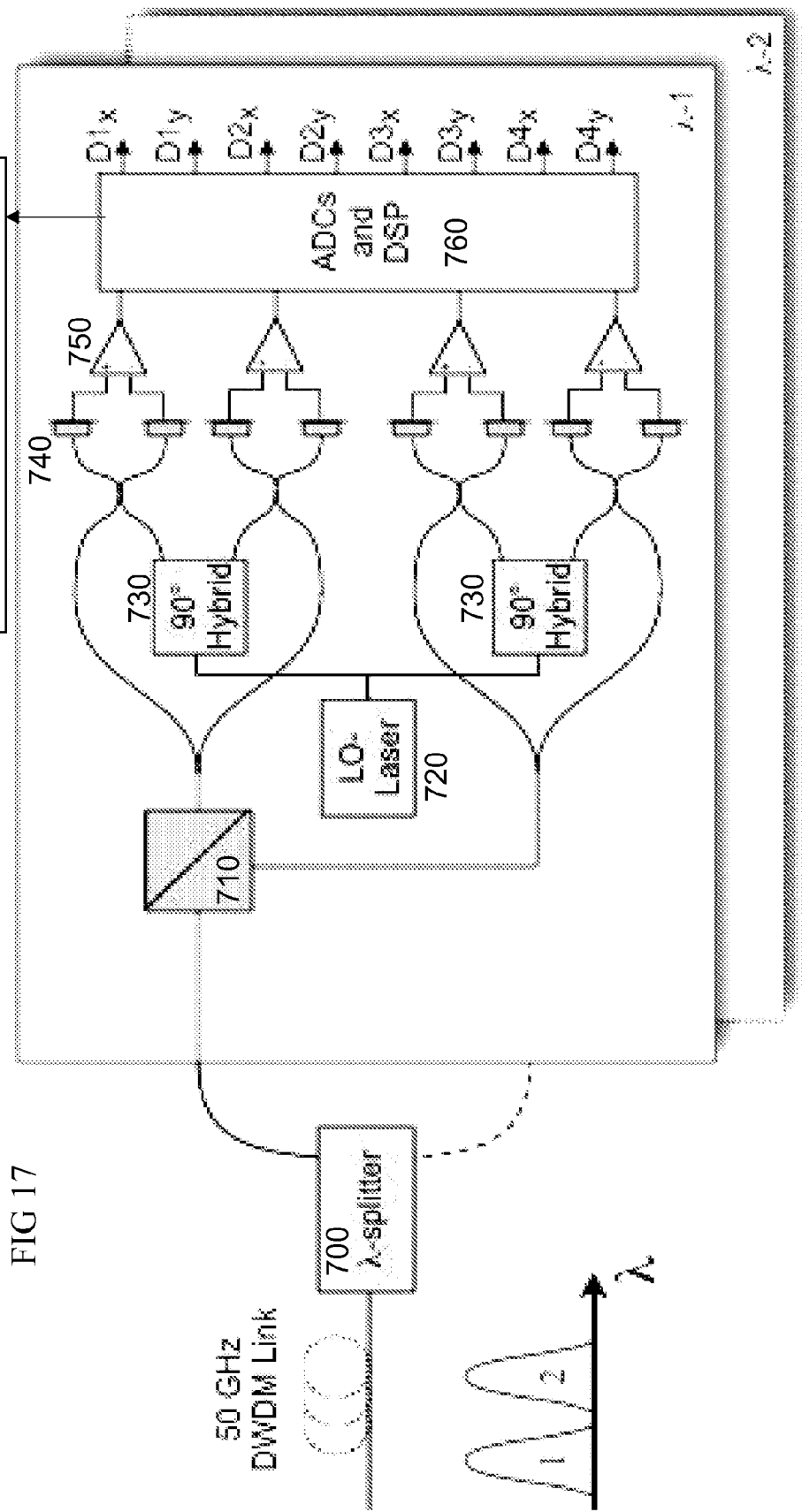
FIG. 17 shows a transceiver for use with transmitter of FIG. 16

FIG. 17, Transceiver for Use with Transmitter of FIG. 16

A corresponding receiver side arrangement is shown in FIG. 17 in the form of an optical transceiver. This has a wavelength splitter 700, then for each of the wavelengths, a polarization demultiplexer 710 feeds optical signals to a coherent optical receiver arrangement. A local oscillator laser 720 feeds 90° hybrids 730. Four optical mixers mix the two phases of the LO optical signal with the two polarizations incoming, to generate four pairs of optical signals which are detected by detectors 740 and fed to differential amplifiers 750. These differential outputs are digitized by ADCs and processed by DSP in block 760 to produce x and y coordinates for D1 to D4. This follows established practice, except that information about the coordinates or distortions from the desired coordinates is measured and is fed back by feedback controller 420, to the transmitter to enable pre-compensation by tuning the modulators.

Figure 18:
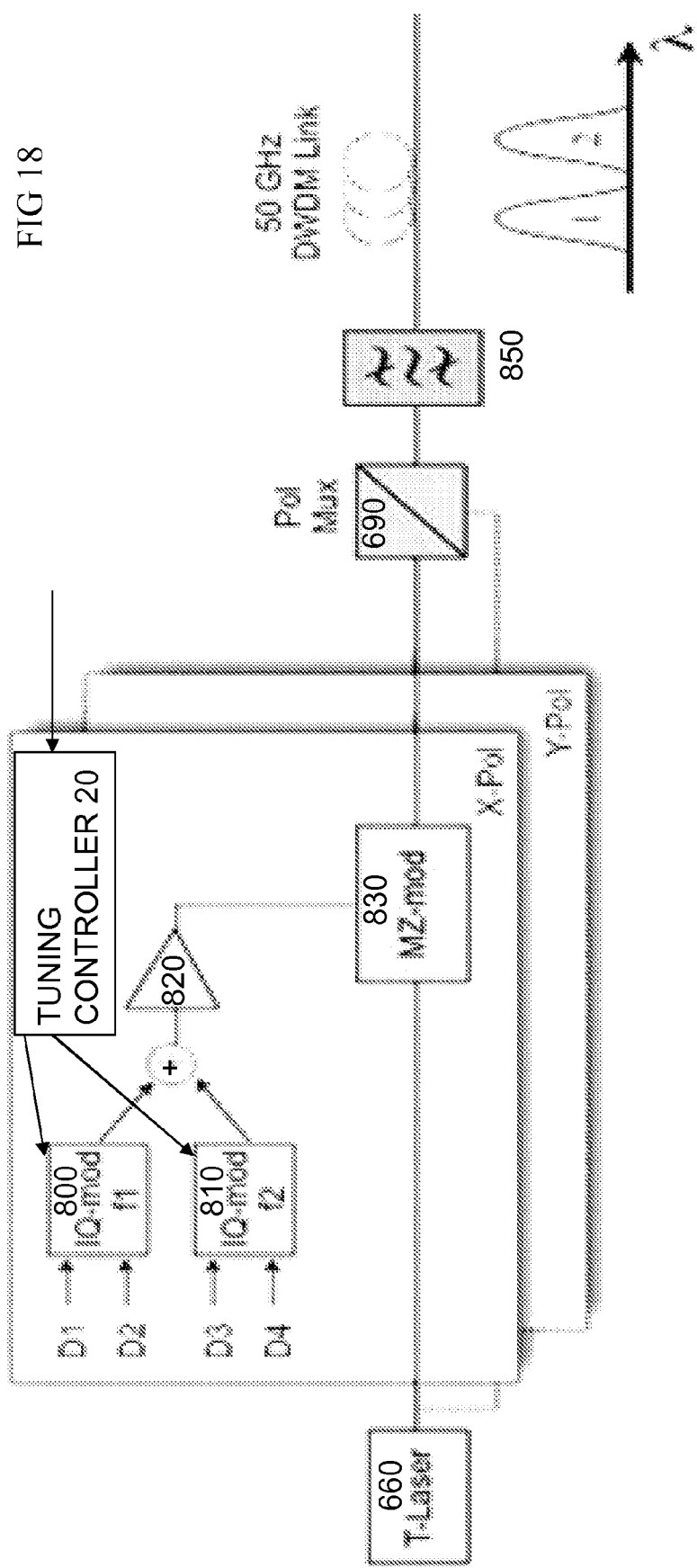
FIG. 18 shows an embodiment showing multiple carriers and for different polarizations.

FIG. 18, Embodiment Showing Transmitter Having Modulators Multiple Carriers and for Different Polarizations In the embodiment of FIG. 18, multiple carriers are modulated in the electrical domain then combined to produce the drive signal for the modulator for modulating the optical signal. A laser 660 feeds X and Y polarization parts, each of these parts having an MZM 830. The MZM modulates the optical signal according to an input from a buffer 820. This is fed by multiple carriers at frequencies f1 and f2 and modulated electrically by electrical IQ modulators 800 and 810 then combined. Non linearities in the optical modulator or elsewhere in the optical path can in principle be pre-compensated by tuning the electrical IQ modulators 800 and 810 if the tuning controller 20 can determine how the measured distortions can be shared between the carriers. Alternatively, a precompensation can be applied after the combination of the carriers, at the driver part 820.

Figure 19:
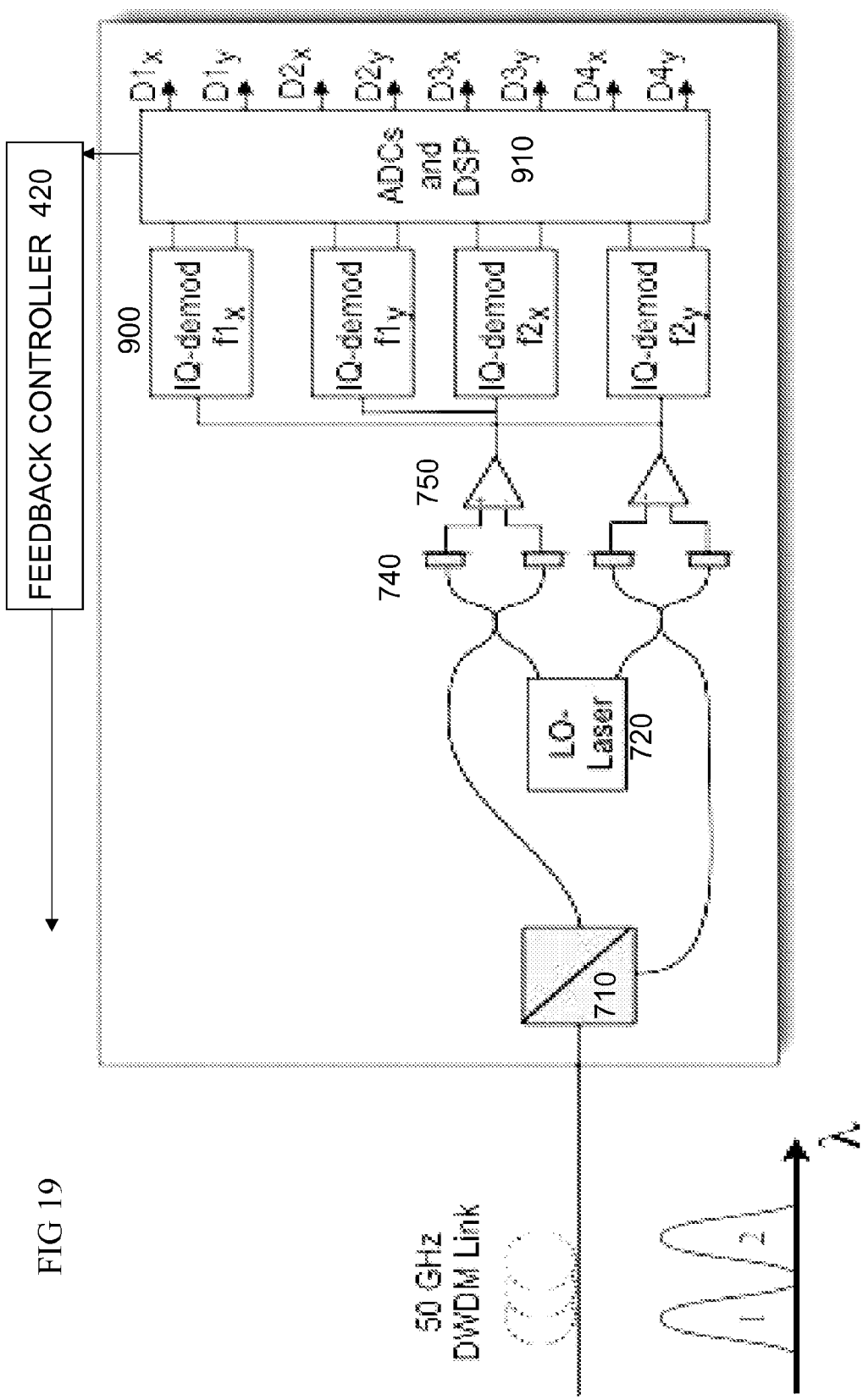
FIG. 19 shows a transceiver for use with transmitter of FIG. 18

FIG. 19, Transceiver for Use with Transmitter of FIG. 18

The corresponding receiver for use with the transmitter of FIG. 18, is shown in FIG. 19 as part of an optical transceiver. In this case, a polarization demultiplexer 710 feeds optical signals to a coherent optical receiver arrangement which differs from that of FIG. 17. A local oscillator laser 720 feeds a pair of mixers to produce two pairs of optical signals which are converted to electrical domain by detectors 740 and fed to differential amplifiers 750. Electrical domain demodulators 900 provide IQ demodulation for f1x, f1y, f2x and f2y. Outputs of these parts are fed to the ADC and DSP block to produce x and y coordinates for D1 to D4. This much follows conventional multicarrier practice and various alternatives can be envisaged. A feedback controller then takes the coordinates or the distortions in them and feeds this back to the transmitter side to enable the pre compensation.

In FIGS. 18 and 19, a SCM implementation is shown where the subcarriers are modulated and combined in the electrical RF domain. Then the combined electrical signal directly modulates a MZM modulator (not an IQ modulator since the IQ structure is built in the electrical domain). The fact that more carriers are summed in the electrical domain means that large peak to average power ratios can be found in the modulating signal and this may cause the driving signal to be more affected by the MZM non linear transfer function.

Another scenario would be OFDM where the subcarriers are again created and combined in the electrical domain but not by analog operation (like in the shown SCM case) but digitally by means of D/A converters. Again large peak-to-average ratios can occur (depending on the number of subcarriers) and MZM modulator non-linearity may affect performance.

Concluding Remarks

Some effects of various embodiments are as follows:
1) Automatic compensation of MZM non-linearity in multilevel optical transmitters can enable improved transmission performance.
2) No need for additional HW circuit/components at transmitter and receiver in some implementations if a feedback path can make use of unused bytes in a frame.
3) It can enable the use of single I-Q modulator-based transmitter for e.g. mQAM reducing the cost of future high capacity transceivers.
4) It can be applied to and enhance the most promising modulation formats (e.g. mQAM) for the 'beyond 100 G' solutions like proposals for 400 G and 1 Tb/s systems.
5) It can enhance the possibility of building a software-programmable transmitter based on single MZM and ADC-based driving signals.

Multi-level modulation formats are becoming a common solution for all high bit rate interfaces in transmission systems. The evolution of high bit rate interfaces has been step by step. Some significant steps have been adopting multi-level transmission at the transmitter and the post processing at the receiver. These two functions have been evaluated individually for different reasons, while the embodiments discussed can be applied to and improve the performance of systems having these two functions, in a new way. Other variations and embodiments can be envisaged within the claims.

The invention claimed is:

1. An optical transmitter for an optical communications system having a remote optical coherent receiver, the optical transmitter comprising:
a modulator, configured to modulate data onto an optical signal for transmission to the coherent receiver, the modulated signal having components at one or more constellations of points of different amplitudes and phases, the modulator being tunable such that distortions of the one or more constellations can be tuned; and
a tuning controller configured to:
receive a feedback signal from the coherent receiver indicating a distortion measured at the coherent receiver, and
automatically tune the modulator to adjust a driving voltage of the modulator based on the received feedback signal to pre-compensate for a measured distortion, wherein the modulator uses a modulation scheme having a same number of constellation points and same geometric pattern of constellation points before and after the automatic tuning, where the automatic tuning tunes the modulator to apply pre-compensation to one or more of the constellation points.

2. The optical transmitter of claim 1, wherein the modulator is arranged to output a single carrier modulated signal, and wherein the modulator is tunable to adjust positions of at least some of the points in the constellation for that carrier.

3. The optical transmitter of claim 2, wherein the measured distortion comprising distortion in the positions of at least some of the points of the constellation.

4. The optical transmitter of claim 3, wherein the modulator is arranged to modulate the data at multiple amplitude levels.

5. The optical transmitter of claim 4, having a feedback path comprising a receiver for receiving an incoming optical signal, and a frame decoder for detecting a frame in the incoming optical signal and detecting a feedback in the detected frame, and passing the feedback to the tuning controller.

6. The optical transmitter of claim 5, wherein the distortion comprising an amplitude non linearity, and wherein the tuning controller is arranged to tune the modulator to alter the amplitudes to pre-compensate for the measured amplitude non linearity.

7. The optical transmitter of claim 2, wherein the modulator comprising a Mach-Zehnder modulator having a multilevel input signal, and circuitry for generating the multilevel input signal from the data, and wherein the modulator is tunable such that output levels of the modulated signal can be tuned by the tuning controller.

8. The optical transmitter of claim 7, wherein the circuitry comprising a digital gain control circuit for producing a multibit digital representation of each of the levels, tunable according to the tuning controller, and a digital to analog converter for converting the multibit digital representation into an analog multilevel signal for driving the Mach-Zehnder modulator.

9. The optical transmitter of claim 8, wherein the circuitry further comprising a tunable digital to analog converter, tunable by the tuning controller.

10. The optical transmitter of claim 8, wherein the circuitry further comprising a digital to analog converter and an analog gain controller tunable by the tuning controller.

11. The optical transmitter of claim 4, wherein the modulator having two or more modulator elements, each for generating a different one of the amplitudes, an optical part for combining optical outputs of the two or more modulator elements, and a tunable optical level controller for controlling relative levels of the optical outputs, under the control of the tuning controller.

12. The optical transmitter of claim 11, wherein the tuning controller is arranged to determine a new tuning setting for the modulator based on the feedback, and on characteristics of the modulator.

13. The optical transmitter of claim 12, wherein the modulator comprising a tunable phase rotator, and wherein the tuning controller is coupled to control a tuning of the phase rotator if the feedback indicates a phase distortion.

14. The optical transmitter of claim 1, wherein the modulator is arranged to output a multicarrier modulated signal.

15. The optical transmitter of claim 14, wherein the tuning controller is arranged to tune the modulator according to a part of the measured distortion which correlates with non-linearities in the modulator to pre-compensate for the non-linearities.

16. A method for tuning a modulator of an optical transmitter for an optical communications system having a remote optical coherent receiver, the method comprising operations of:
    modulating data onto an optical signal for transmission to the coherent receiver, the modulated signal having components at one or more constellations of points of different optical amplitudes and phases;
    receiving feedback from the coherent receiver indicating distortion measured at the coherent receiver; and
    tuning the modulating operation by adjusting a driving voltage used for modulation based on the received feedback to pre-compensate for the measured distortion, wherein the modulating operation uses a modulation scheme having a same number of constellation points and same geometric pattern of constellation points before and after the tuning, where the tuning tunes the modulation operation to apply pre-compensation to one or more of the constellation points.

17. The method of claim 16, wherein modulating operation further comprising outputting a single carrier modulated signal, and wherein tuning operation further comprising adjusting positions of at least some of the points in the constellation for that carrier.

18. The method of claim 17, wherein the measured distortion in the received feedback comprising distortion in the positions of at least some of the points of the constellation.

19. The method of claim 18, wherein the modulating operation further comprising modulating the data at multiple amplitude levels.

20. The method of claim 18, wherein the feedback is incorporated in an incoming optical signal, and wherein the method further comprising an operation of detecting a frame in the incoming optical signal and detecting a feedback in the frame.

21. The method of claim 19, wherein the distortion comprising an amplitude nonlinearity, and wherein the method further comprising an operation of tuning the modulating operation to alter the amplitudes to pre-compensate for the measured amplitude nonlinearity.

22. The method of claim 20, wherein the modulating operation further comprising using a Mach-Zehnder modulator having a multilevel input signal, and generating the multilevel input signal from the data, and wherein the tuning operation further comprising tuning of output levels of the modulated signal.

* * * * *